UNITED STATES PATENT OFFICE.

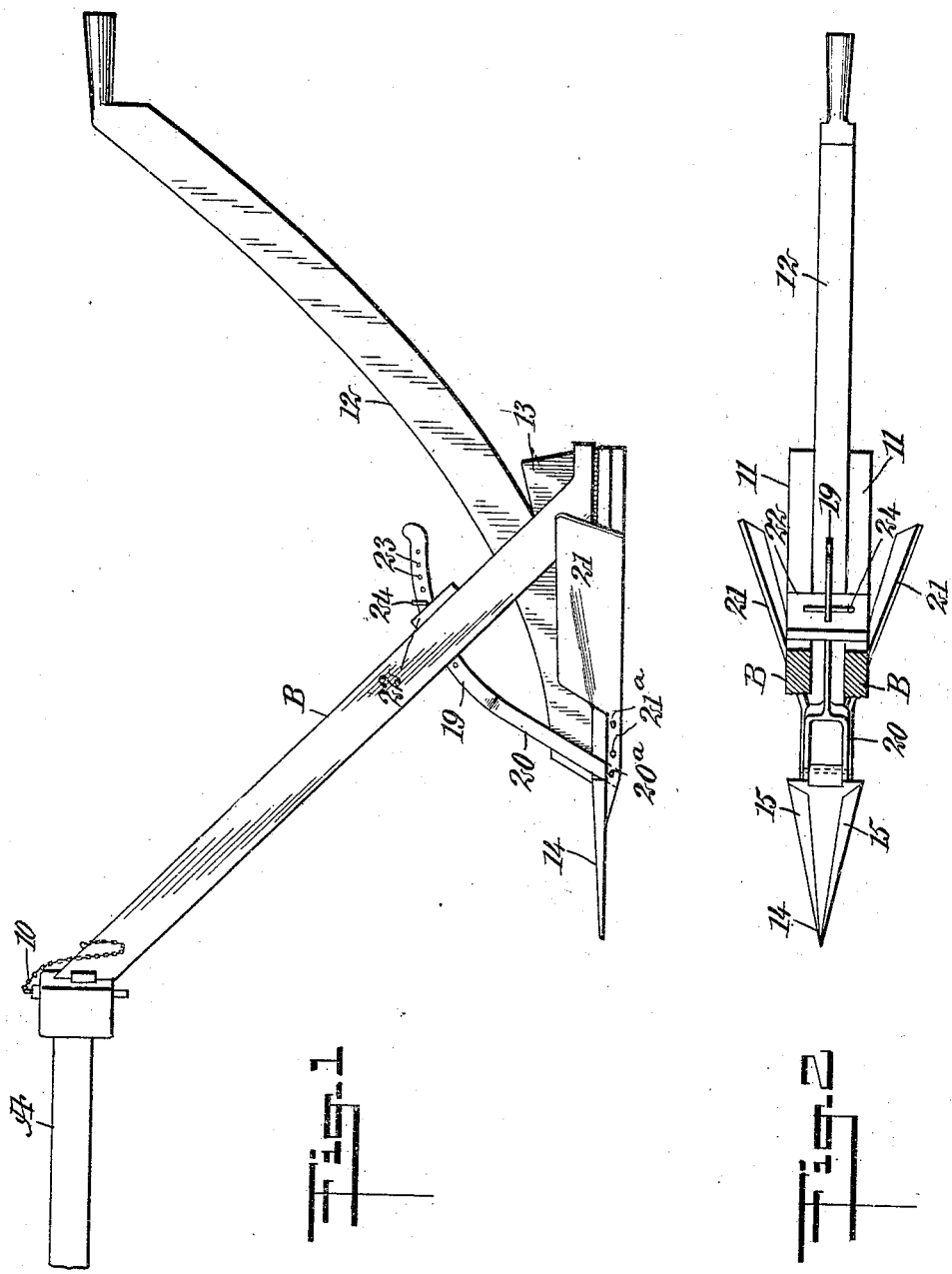

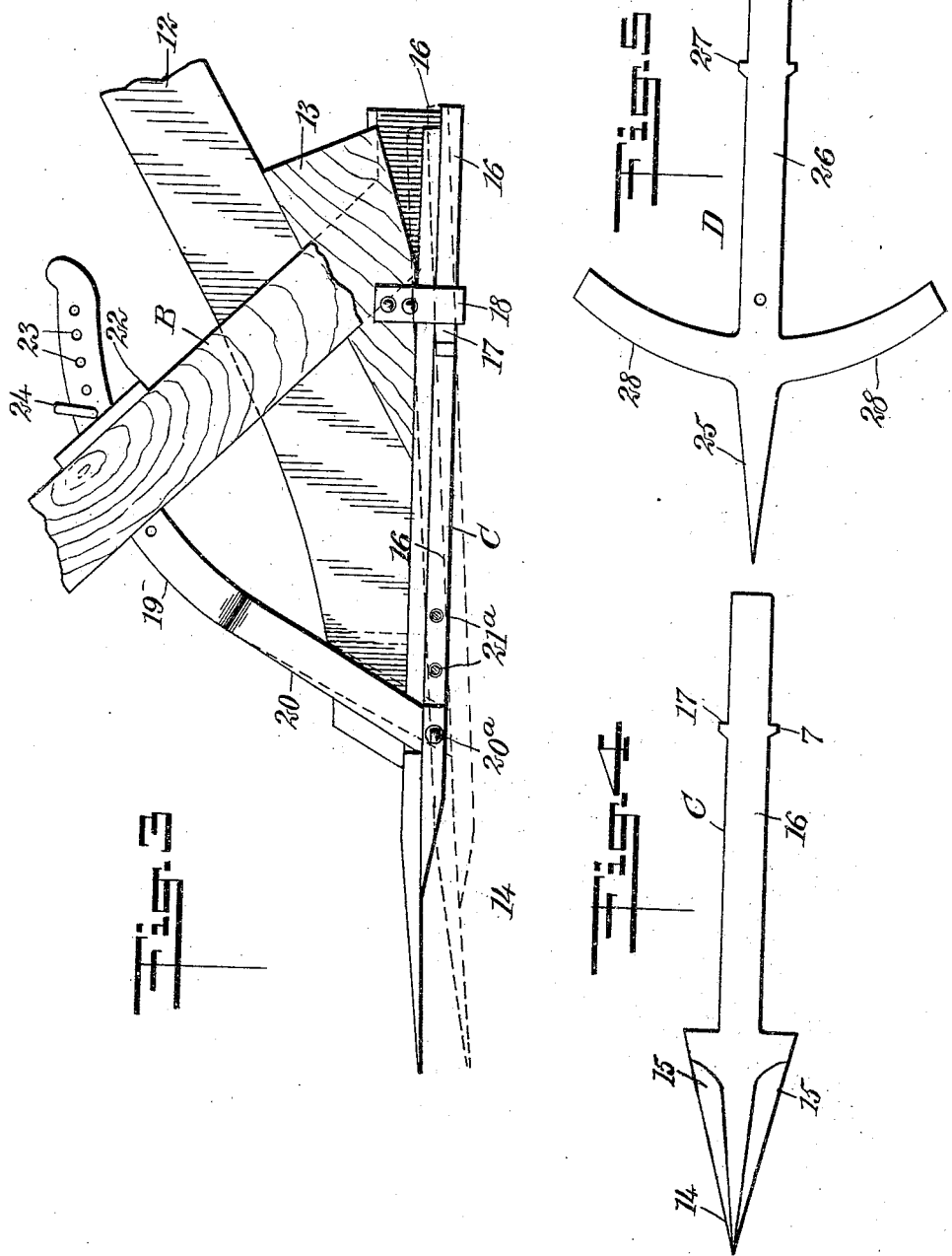

JOSÉ COLOMÉ, OF CARACAS, VENEZUELA.

PLOW.

945,696.  Specification of Letters Patent.   Patented Jan. 4, 1910.

Application filed February 20, 1909. Serial No. 479,076.

*To all whom it may concern:*

Be it known that I, JOSÉ COLOMÉ, a citizen of the Republic of Venezuela, and a resident of Caracas, Venezuela, South America, have invented a new and useful Improvement in Plows, of which the following is a full, clear, and exact description.

The purpose of the invention is to provide an improvement upon the old Arabian plow still widely used in the Spanish republics, whereby to render the said type of plow more efficacious without complicating its construction, and to better adapt it for use in mountainous districts.

It is also a purpose of the invention to provide a means whereby the point of the share may be adjusted to enter the ground to a greater or lesser depth and be firmly held in adjusted position.

The invention consists in the novel construction and combination of the several parts as will be hereinafter fully set forth and pointed out in the claims.

Reference is to be had to the accompanying drawings forming a part of this specification, in which similar characters of reference indicate corresponding parts in all the figures.

Figure 1 is a side elevation of the improved plow; Fig. 2 is a sectional plan view of the plow; Fig. 3 is an enlarged side elevation of the lower portion of the plow, one of the wings for widening the furrow being removed; Fig. 4 is a sectional plan view of the share with the wings removed; and Fig. 5 is a plan view of a substitute share adapted for weeding and for covering purposes.

A represents the draft device for the plow, to which the draft animal is attached, and in this form of the plow the said draft device consists of shafts.

B represents a beam that extends down from the draft device, being removably attached to said draft device by a pin 10, or its equivalent, as is customary. This beam B, which extends downwardly and rearwardly, is bifurcated at its lower portion, as is indicated at 11 in Fig. 2, and between the lower or bifurcated portion of the beam B, the lower end of a single handle 12 is passed, which handle extends over and normally rests upon the upper face of the share C. This handle 12 is detachably held with respect to the beam B by a wedge section 13, attached to the lower portion of the handle 12, and jammed between the lower end portions of the beam B, as is shown in Fig. 3.

The share C consists of a point 14 that is in the form of an arrow-head, and the side portions 15 of the point are up-turned and carried over its upper face to a greater or lesser extent so as to facilitate the work of opening a furrow. The shank 16 of the share extends rearward from the point 14 a suitable distance, and is provided with opposing offsets 17 at its side edges, and when the share is in position on the frame of the plow, these offsets 17 engage with the forward edges of a strap 18 that extends around the shank 16 of the share and is attached to the wedge section 13 of the frame of the plow, as is clearly shown in Fig. 3, but I desire it to be understood that I do not confine myself to this particular mode of attachment, the offsets 17 serving to prevent the share from working backward in passing through the ground.

An adjusting arm 19 is employed in connection with the share C. This adjusting arm is upwardly and rearwardly curved at its upper portion, as is particularly shown in Figs. 1 and 3, and its lower portion 20 is bifurcated, and the members 21 of the bifurcated portion of the said adjusting arm are attached at each side of the point 14 by a suitable bolt 20ª, or its equivalent, to the share C. The upper curved central portion of the adjusting arm 19 is passed through a suitable opening in a plate 22 that extends from one lower member 11 to the other of the beam B, as is best shown in Fig. 2, and the said entering or single member of the adjustable arm 19 is also provided with a series of apertures 23, and a pin 24, or like device is passed through any one of the said apertures, engaging with the rear face of the spanning plate 22 carried by the beam B. Thus it will be observed by the adjustment of the said arm 19 upward or downward, the point 14 of the share may be made to enter the ground to a greater or lesser extent.

In connection with the shank 16 of the plow share C, I employ deflecting wings 21 that are located at opposite sides of the shank 16 of the share, and extend from the rear of the point 14 a predetermined distance in direction of the rear end of the shank. These wings 21 are flared outward and have also an inclination upward and outward and are of much greater depth than the depth of the shank 16, in fact the wings 21, as is shown in Fig. 1, extend some distance up beyond the upper face of the shank of the plow share. These wings 21 serve to widen the furrow made by the point 14.

It will be observed that the adjustment of the point of the share can be quickly and conveniently made, and that the plow is readily adapted to till any character of soil obtainable in the South American republics, and it is particularly adapted for use in mountainous regions since it is very compact and can be used to good effect upon a hillside.

In Fig. 5 I have illustrated a substitute for the share C shown in the other figures. This particular form of share D consists of a point 25 forming an integral portion of a shank 26 that is in all particulars similar to the shank 16 of the share C, and is provided with opposing offsets 27 corresponding to the offsets 17 of the share shown in Fig. 4, but the share D shown in Fig. 5 is provided with opposing cutters 28, located where the point 25 connects with the shank 26, and these cutters are curved rearwardly and extend in opposite directions and are given such lateral inclination as will serve to render them effective in scraping the surface of the ground over which they are carried.

Having thus described my invention, I claim as new and desire to secure by Letters Patent:

1. A plow, comprising a beam, a share carried by said beam, a handle arranged above said share, and a common member for securing said share and said handle in position.

2. A plow, comprising a beam, a share having a rocking relation with said beam, a handle carried by said beam, a common member for securing said share and said handle in position, and an adjusting member secured to said share, and adjustably associated with said beam.

3. A plow, comprising a beam having a bifurcated part, a share having a part between the sides of said bifurcated part of said beam, a handle positioned above said share and having a part between the sides of said bifurcated part of said beam, and a wedge between said share and said handle, for jamming the same in place.

4. A plow, comprising a beam having a bifurcated part, a share having a part between the sides of said bifurcated part of said beam, a handle positioned above said share and having a part between the sides of said bifurcated part of said beam, a wedge between said share and said handle, for jamming the same in place, an adjusting arm secured to said share, and means for adjustably securing said arm to said beam.

5. A plow, comprising a beam having a bifurcated part, a share having a shank extending through said bifurcated part and resting upon the lower end thereof, a handle extending through said bifurcated part, a wedge removably positioned between said shank and said handle, and jamming the same in place, an adjusting arm pivotally secured to said shank near the point of said share, said beam having an opening, said arm extending through said opening, a pin adapted to be associated with said arm at a plurality of points for holding it in a plurality of positions with respect to said beam, and draft gear secured to said beam.

6. A plow, comprising a beam having a bifurcated part, a share having a shank extending through said bifurcated part and resting upon the lower end thereof, a handle extending through said bifurcated part, a wedge removably positioned between said shank and said handle, and jamming the same in place, an adjusting arm pivotally secured to said shank near the point of said share, said beam having an opening, said arm extending through said opening, a plate having an opening therethrough, and located on the side of said beam remote from said share, said arm extending through said plate and having a plurality of holes therethrough, a pin adapted to be positioned in each of said holes, and draft gear secured to said beam.

7. A plow, comprising a beam having a bifurcated part, a share having a shank arranged in said bifurcated part and having a member removably mounted thereon and extending through said bifurcated part, a handle arranged in said bifurcated part, and a wedge positioned under said member and serving to jam said handle and said share in place, said share being laterally extended, said member being pointed and having oppositely extending cutters.

8. In a plow, the combination with the beam thereof, of a share mounted for rocking relation to the said beam, the said share comprising an arrow-head point having its sides upwardly and inwardly curved, a shank that extends rearwardly from the point, and an arm that extends from the said point through the said beam and having guided movement therein, and means for locking the said arm relatively to the said beam.

In testimony whereof I have signed my name to this specification in the presence of two subscribing witnesses.

JOSÉ COLOMÉ.

Witnesses:
E. HENY,
R. NAVARRO.